(12) United States Patent
Bryborn et al.

(10) Patent No.: US 7,246,321 B2
(45) Date of Patent: Jul. 17, 2007

(54) EDITING DATA

(75) Inventors: Mattias Bryborn, Lund (SE); Stefan Lynggaard, Lund (SE)

(73) Assignee: Anoto AB, Lund (SE)

( * ) Notice: Subject to any disclaimer, the term of this patent is extended or adjusted under 35 U.S.C. 154(b) by 735 days.

(21) Appl. No.: 10/193,175

(22) Filed: Jul. 12, 2002

(65) Prior Publication Data

US 2003/0023644 A1      Jan. 30, 2003

Related U.S. Application Data

(60) Provisional application No. 60/305,867, filed on Jul. 18, 2001.

(30) Foreign Application Priority Data

Jul. 13, 2001    (SE) .................................... 0102502

(51) Int. Cl.
*G06F 17/00* (2006.01)

(52) U.S. Cl. ...................... 715/741; 715/831; 715/863; 382/175; 178/18.01; 178/18.03; 345/173

(58) Field of Classification Search ............... 715/741, 715/863, 541, 831; 382/175; 178/18.01, 178/18.03; 345/173, 831
See application file for complete search history.

(56) References Cited

U.S. PATENT DOCUMENTS

| | | | | |
|---|---|---|---|---|
| 4,589,062 | A | * | 5/1986 | Kishi et al. .................. 700/187 |
| 5,048,099 | A | * | 9/1991 | Lee .............................. 382/175 |
| 5,167,016 | A | * | 11/1992 | Bagley et al. ............... 715/531 |
| 5,184,732 | A | * | 2/1993 | Ditchburn et al. .......... 209/576 |
| 5,220,649 | A | * | 6/1993 | Forcier ........................ 715/541 |
| 5,448,475 | A | * | 9/1995 | Senoo et al. ................. 715/531 |
| 5,465,325 | A | * | 11/1995 | Capps et al. ................. 345/441 |
| 5,500,937 | A | * | 3/1996 | Thompson-Rohrlich .... 715/764 |
| 5,523,775 | A | * | 6/1996 | Capps .......................... 345/179 |
| 5,548,700 | A | * | 8/1996 | Bagley et al. ............... 715/540 |
| 5,583,542 | A | * | 12/1996 | Capps et al. ................. 345/173 |

(Continued)

FOREIGN PATENT DOCUMENTS

EP         0615 209 A2      3/1994

(Continued)

OTHER PUBLICATIONS

Mendham, "Understanding Selection Tools: Part II, The Lasso", PC World, May 27, 2004.*

(Continued)

*Primary Examiner*—Doug Hutton
*Assistant Examiner*—James H. Blackwell
(74) *Attorney, Agent, or Firm*—Birch, Stewart, Kolasch & Birch LLP

(57) ABSTRACT

The invention relates to a method of editing data generated by handwriting. The method comprises the steps of
  detecting an initiation of an editing;
  identifying a marking stroke which marks data that is to be edited;
  determining an essentially minimal convex envelope which surrounds the marking stroke;
  identifying the remaining data, in addition to the data of the actual marking stroke, which is positioned within the convex envelope; and
  performing an editing operation on said data positioned within the convex envelope.

The invention also relates to a handheld device and a computer program for editing of data generated by handwriting.

26 Claims, 7 Drawing Sheets

U.S. PATENT DOCUMENTS

| | | | |
|---|---|---|---|
| 5,592,608 A * | 1/1997 | Weber et al. | 715/863 |
| 5,602,570 A * | 2/1997 | Capps et al. | 345/173 |
| 5,659,639 A * | 8/1997 | Mahoney et al. | 382/309 |
| 5,682,439 A * | 10/1997 | Beernink et al. | 382/187 |
| 5,796,406 A * | 8/1998 | Shigematsu et al. | 715/863 |
| 5,867,150 A * | 2/1999 | Bricklin et al. | 345/173 |
| 5,889,523 A * | 3/1999 | Wilcox et al. | 715/854 |
| 5,953,735 A | 9/1999 | Forcier | 715/541 |
| 5,991,441 A | 11/1999 | Jourjine | 382/187 |
| 6,119,069 A * | 9/2000 | McCauley | 702/5 |
| 6,259,043 B1 | 7/2001 | Clary et al. | 178/18.01 |
| 6,348,648 B1 * | 2/2002 | Connick, Jr. | 84/477 R |
| 6,438,523 B1 * | 8/2002 | Oberteuffer et al. | 704/270 |
| 6,525,749 B1 * | 2/2003 | Moran et al. | 715/863 |
| 6,587,587 B2 * | 7/2003 | Altman et al. | 382/181 |
| 6,603,486 B1 * | 8/2003 | Baran et al. | 345/672 |
| 6,690,364 B1 * | 2/2004 | Webb | 345/173 |
| 6,829,748 B1 * | 12/2004 | Browne et al. | 715/531 |
| 6,903,751 B2 * | 6/2005 | Saund et al. | 345/619 |
| 2003/0214536 A1 * | 11/2003 | Jarrett et al. | 345/831 |
| 2006/0001656 A1 * | 1/2006 | LaViola et al. | 345/179 |

FOREIGN PATENT DOCUMENTS

| | | |
|---|---|---|
| EP | 0 992 877 A2 | 4/2000 |
| GB | 2 352 156 A | 1/2001 |
| WO | WO 99/15991 | 4/1999 |
| WO | WO 01/16691 A1 | 3/2001 |
| WO | WO 01/22207 A1 | 3/2001 |
| WO | WO 01/71473 A1 | 9/2001 |

OTHER PUBLICATIONS

Hardock et al., "A Marking Based Interface For COllaborative Writing", 1993, Proc. of UIST'03, pp. 259-266.*

C. Cohen, "The Gesture Recognition Home Page", Web Site Cybernet.com, last updated Nov. 15, 2005, pp. 1-5.*

C. Cohen, "A Brief Overview of Gesture Recognition", Web Site Cybernet.com, las updatedFeb 10, 1999, pp. 1-13.*

Goldberg et al., "Stylus User Interfaces for Manipulating Text", Nov. 11-13, 1991, ACM, pp. 127-135.*

Fonseca, M. et al., "Experimental Evaluation of an On-Line Scribble Recognizer", Oct. 2001, in Pattern Recognition Letters 22, pp. 1311-1319.*

O'Rourke, J., "Finding Minimal Enclosing Boxes", 1985, Intl. Journal of Computer & Information Sciences, vol. 14, No. 3, pp. 183-199.*

Patent Abstract of Japan; Japan No. 2000285251; published Oct. 13, 2000; Shigeo, et al.

* cited by examiner

EDITING DATA

This application claims priority on provisional Application No. 60/305,867 filed on Jul. 18, 2001, the entire contents of which are hereby incorporated by reference.

FIELD OF THE INVENTION

The present invention relates to editing of data generated by handwriting.

BACKGROUND ART

Currently, a variety of techniques are available for generating data while a person is writing by hand. In the present application this relates to generating an electronic representation of the characters that the person is writing by hand.

Such a prior-art technique implies that the person uses a specific electronic device which is provided with a screen on which the person can write directly using a handwriting device in the form of an elongate instrument. The electronic device is constructed so as to be able to detect and store, as said data, the characters that the person is writing on the screen. The device is also capable of reproducing the characters on the screen so that the person may see what she is writing.

Another prior-art technique implies that the person uses a handwriting device in the form of an ordinary pen and writes on an ordinary sheet of paper. However, the sheet of paper is specific insofar as it is provided with a position code coding a plurality of positions on the surface. The positions are located close to each other. The pen is also specific insofar as it comprises a device which detects the position code while the person is writing with the pen. The detected positions are stored, as said data, and can then be processed as any electronic data and can, for instance, be transferred to a computer or some other electronic device, for instance via short range radio, and be further processed as desired.

In addition to said further processing of data, the person who is writing sometimes wants to edit data directly and with the aid of the handwriting device. Then there is a need for a simple and clear manner of marking what is to be edited. The existing methods are based on a closed curve being drawn round the text to be edited. Examples of this are disclosed in EP-615,209 B1 where a variant means that a closed curve is drawn using a special end of the pen and, thus, a deleting function is activated that deletes all data representing positions inside the curve. Another variant means that two diagonally arranged corner points of a rectangle are indicated by means of the ordinary writing end of the pen. All data representing positions within the rectangle that is made up by the corner points is thus marked.

The prior-art methods are relatively complicated and require the user to be very accurate when performing the marking and also to carry out the marking in a special manner.

SUMMARY OF THE INVENTION

The object of the invention is to provide an accurate and efficient method of editing data generated by handwriting, said method affording a great freedom of choice as to how the user marks what is to be edited.

The object is achieved by a method of editing data generated by handwriting according to the appended claim 1. Correspondingly, the object is achieved by a handheld device and a computer program for editing data generated by handwriting according to the appended claims 23 and 24, respectively.

According to one aspect of the invention, a method of editing data generated by handwriting is thus provided, comprising the steps of detecting an initiation of an editing;

identifying a marking stroke which marks data that is to be edited;

determining an essentially minimal convex envelope which surrounds the marking stroke;

identifying the remaining data, in addition to the data of the actual marking stroke, which is positioned within the convex envelope; and performing an operation on said data positioned within the convex envelope.

The method according to the invention is applicable to many different techniques of handling the handwriting and the generating of data, including the two techniques mentioned above. Each data set that relates to handwritten characters and that has a connection to position so that it can be determined to which data a marking which is also handwritten relates, can in principle be processed according to the method. By "written characters" is besides here meant anything that a person may write and draw by hand. A character can thus be, for instance, a letter, an indefinite curve, a symbol or a freely drawn line included in a drawing. A "convex envelope" is understood by a person skilled in the art as a convex polygon which surrounds a quantity of dots. The convex polygon is such that a line between two arbitrary dots on the edge of the polygon is located completely inside the edge. By "minimal convex envelope" is meant precisely the smallest possible convex polygon surrounding a quantity of dots. According to the invention, an approximation is provided in the form of an essentially minimal convex envelope. This definition means that when determining the convex envelope there should at least be a striving after the minimal convex envelope. However, it will be appreciated by those skilled in the art that in practice it is impossible, or in any case unrealistic, to achieve a strictly minimal convex envelope since the time of execution must be limited.

In this technical field, "stroke" is the expert term for a continuous curve formed between a putting down of a pen and a subsequent raising of the pen. The corresponding Swedish term is "penndrag", which however is normally not used by those skilled in the art.

An essential advantage of the above method according to the invention is that the use of the convex envelope to surround the marking stroke makes the method relatively insensitive to how the marking is made. For instance, a closed ring is not necessary, like in the above-discussed known document, but the marking can be made in the person's usual way when writing on a sheet of paper with a pen, for instance an extended zigzag line or a spiral. The convex envelope is adapted according to the method so as to be essentially minimal. In other words, it is not made larger than necessary. In combination with the basic definition of the convex envelope, this adaptation means that the envelope essentially connects to the extreme points of the marking. Since there are situations where the distance is small between a character that the writing person wants to edit and a character that should remain unchanged, it is desirable to have a method of identifying the marking which is accurate. When using the inventive method, it is possible to achieve great accuracy and yet short calculation times for determining an essentially minimal convex envelope.

According to an embodiment of the invention, the actual determination of the envelope implies that the convex envelope has an extent in a starting position and that the extent is then adapted to the marking as made, so that the marking stroke, or, if desired, the data representing the marking stroke, is precisely surrounded by the envelope, i.e. according to some rule belongs to the envelope, or, if desired, is located within the envelope. This figurative terminology originates from the idea that the envelope is illustrated on a writing surface by drawing the edge of the envelope round the marking as made. Preferably the envelope has in the starting position a minimum extent which is then extended according to a suitable algorithm until the marking is surrounded. The envelope can, in terms of definition, have the extent zero in the starting position.

According to another embodiment of the invention, the minimal convex envelope is approximated with a convex envelope consisting of a plurality of intersecting planes. In this embodiment, the time of execution for determining the convex envelope can be controlled particularly well. Besides, for different devices and different applications, different numbers of planes and, thus, easier or more complicated calculations, but also a more or less approximative restriction of the marking, can be selected according to means and needs. The term "plane" here relates to the mathematical geometry as defined by the plane equation $Ax+By+Cz+D=0$. In a two-dimensional case, which at least currently should be the most frequent, $C=0$. It means that the plane is parallel with the z axis. The representation in the x-y plane will then be a line which is given a direction represented by the normal (A,B) of the plane/line. Thus, the line can also be regarded as a vector. Consequently, it should be possible to use, in a two-dimensional case, the equation of the straight line, but in order not to confuse the reader, the plane equation is maintained as the form of the definition. Moreover, the plane equation is advantageous for computerized calculations. The term "plane" will thus be used throughout the present application even in the case where only one line is illustrated in an associated figure.

According to one more embodiment, the marking stroke is seen as a formation which comprises one or more positions. For instance, in the case where the handwritten characters are detected/read and stored electronically, a quantity of positions is usually obtained in connection with the transfer to the electronic representation by the detection taking place in discrete moments at a certain detecting frequency, or sampling frequency. The extent of the convex envelope is changed for each position by relating the position to the location of each plane, one plane at a time, and moving the plane if the position according to a location criterion is positioned on the outside of the plane and, thus, outside the convex envelope, so that the position is located in or on the inside of the plane, and thus within the convex envelope. The expression "within the convex envelope" thus comprises according to this embodiment the limit position where a position is located in a plane. Since the number of planes is constant, a constant execution time for the processing of each position is obtained, which is advantageous.

According to the invention, the remaining data that is positioned within the envelope is identified, i.e. the character or characters or the part or parts of a character that is/are surrounded by the edge of the envelope. This remaining data is to be found among the characters written before the marking stroke. More specifically, data is searched for one or more strokes performed before the marking stroke, and it is determined for each stroke whether at least a part thereof is positioned within the envelope. The operation is then carried out either on precisely the remaining data that is positioned within the envelope or on whole strokes, even if only a part of one or more strokes is represented among said remaining data.

The last-mentioned embodiment, i.e. a whole stroke being edited even if only a part thereof is positioned within the envelope, is advantageous, for instance, if the writing person wants to make a marking that is a single stroke, for instance an inclined stroke over a character that the writing person wants to delete. When the minimal convex envelope for such a marking is determined, probably only a part of the character to be deleted will be positioned within the envelope. Consequently it does not matter in this embodiment, and the entire character is edited, provided that it is a single stroke or that all the strokes involved are touched by the marking stroke.

On the other hand, it is sometimes important that only precisely the data that is surrounded by the envelope be affected. The marking alternative that is applicable can be conditioned, for instance by how the marking is performed. There are many conceivable variants, a favorable variant being that an essentially straight stroke indicates that the operation is to be carried out on the whole stroke whereas all other forms of marking indicate that exactly what is positioned within the envelope is to be edited.

The above described method for determining the envelope can in many respects be used also to determine what data is positioned within the envelope. By each stroke according to an embodiment being represented by one or more positions, the location of each position in relation to the plane of the envelope can, as stated above, be determined, and if it is established that the position is located within the envelope, it is identified to be included in data that is to be edited. Then the operation is carried out starting from said data that is to be edited.

There are a plurality of conceivable operations. A closely related operation is to delete a marked character, i.e. to delete corresponding data. Another example is choice of colors, i.e. that data when presented on a display is shown in a selected color. Further examples are copying the marked character and formatting, i.e. choice of e.g. line thickness, hatching, font etc.

The method further comprises detection of an editing being initiated. Such an initiation can be carried out in different ways depending on the technique that is used for the writing and the generating of data. According to an embodiment of the inventive method, it is detected that the writing person places a handwriting device within an initiating area on a surface. In other words, a particular initiating area is marked on or beside the writable surface. For instance, a small box may be involved, marked with "Edit" for editing. When the device is applied against the initiating area, this will be detected. According to different embodiments of the invention, the detected initiation results in either the immediately preceding or immediately following stroke with the writing device being assumed to be the marking stroke. Other variants are, of course, feasible, but less natural to the writing person.

BRIEF DESCRIPTION OF THE DRAWINGS

The invention and additional advantages will now be described in more detail by way of embodiments and with reference to accompanying drawings, in which.

DESCRIPTION OF EMBODIMENTS

Figure 3:
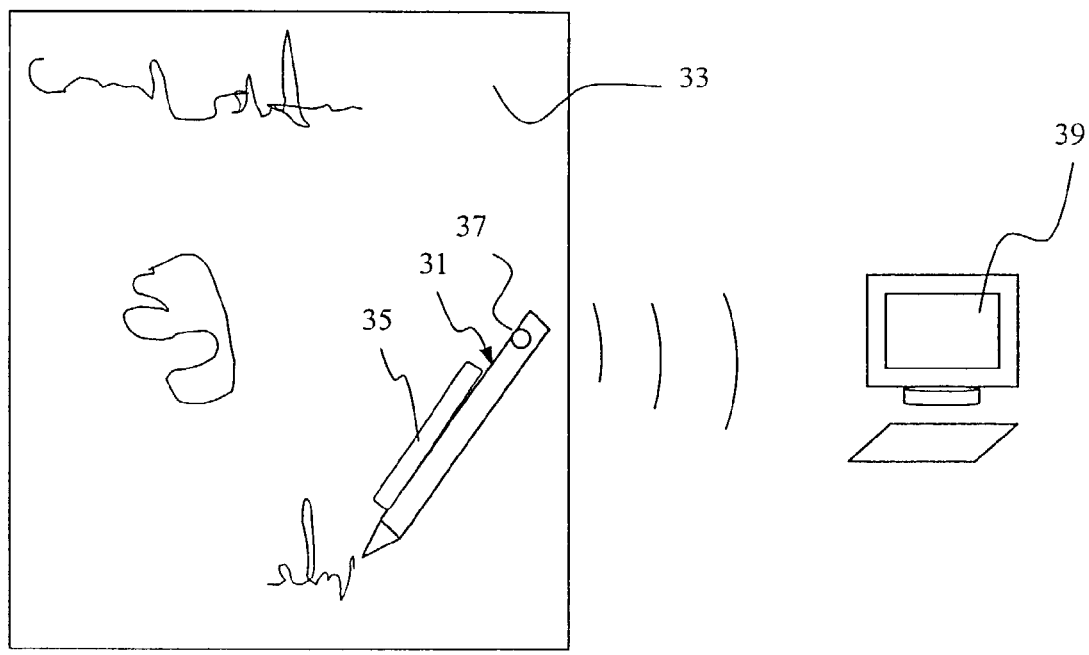
FIG. 3 shows an application of the invention where a pen is used for writing on a sheet of paper which is provided with a position code.

An embodiment of the method of editing data generated by handwriting according to the invention will now be described for the case where the actual writing equipment is a writing device 31 and a writing surface 33 of a special type as illustrated in FIG. 3. The handheld device for editing data generated by handwriting in accordance with the invention is here embodied by the writing device 31. This is an interesting variant of handwriting, where the writing surface 33 is provided with a position code in the form of e.g. groups of dots of the type as disclosed, for example, in Applicant's International Patent Application WO 01/16691. The dots in the groups of dots are displaced in relation to a virtual raster in such a manner that each group of dots uniquely codes the position where it is located. The position code is not appreciably seen with the naked eye but is rather perceived as a gray shading of the writing surface 33. The writing surface 33 is, for instance, a sheet of paper. The writing device 31 is in the form of a pen and is used to write ordinary text on the writing surface 33. The pen thus is provided with an ink cartridge or the like which is not shown in more detail. The pen 31 is also provided with a reading unit 35, such as a camera, which reads the position code on the writing surface 33, and a processor (not shown) which is connected to the reading unit 35 and which is adapted to store and analyze data generated by the reading unit 35. The operation of the processor is, at least in part, controlled by a computer program for editing data generated by handwriting in accordance with the invention. The data generated represents what is being written, i.e. different characters such as letters, figures etc, on the writing surface 33. Virtually, data indicates the positions that are read by the pen 31 when the user is writing with it. By the writing device 31 simultaneously detecting the beginning and the end of each stroke, i.e. putting down and raising of the pen 31, the stored data simultaneously constitutes a representation of the characters that have been written.

The writing device 31 further includes a transceiver 37 for wireless transfer of information across short distances. In addition to radio, for instance IR light and wire connection are conceivable alternative transferring techniques. Thus the writing device is adapted to transfer position data for the read positions, preferably wirelessly by means of short range radio, to another device 39, for instance a server which preferably is reached via a PC, PDA or the like, or via a mobile phone. As a result, the written characters can easily be sent to, for example, an electronic device which comprises a display on which they can be shown. When data is edited, it is thus possible to edit data that has been stored locally in the pen 31 and/or edit data that has already been sent to another device.

Figure 2A:
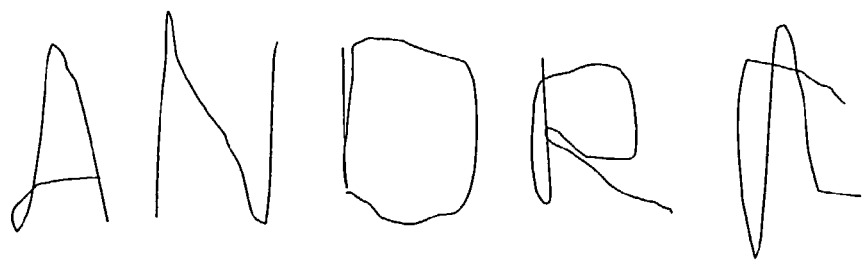
FIGS. 2a-f illustrate schematically an example of how the method according to the invention is used.
Figure 5:
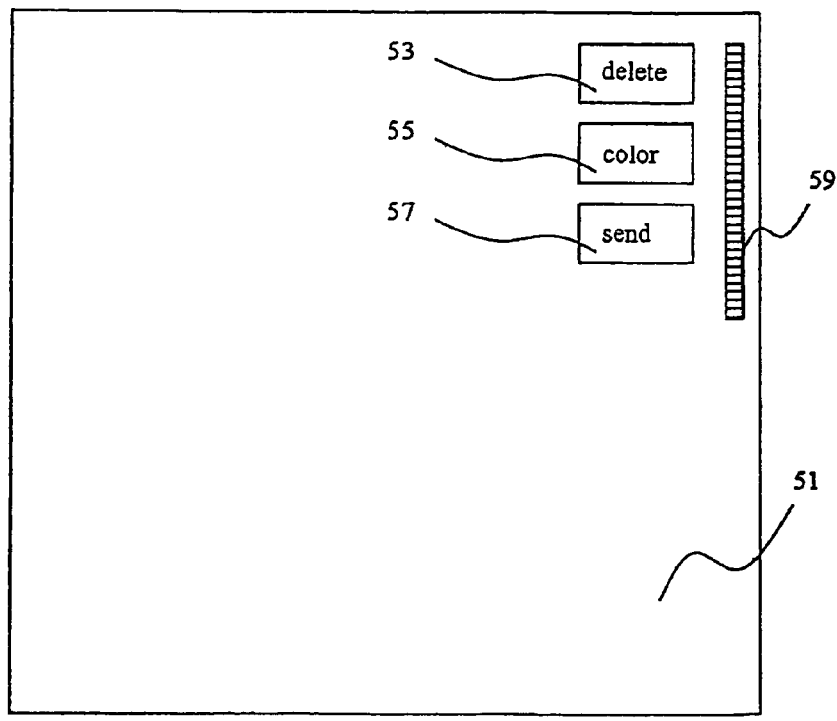
FIG. 5 shows examples of operation boxes for various editing operations.

For the sake of simplicity, let us assume that a user of the pen 31 has written the word "ANDRA" as shown in FIG. 2a. The user discovers that an editing has to be made. Assume that the desired editing is a deletion, which is a common operation. Assume that it is the last letter in the word that is to be deleted. In this embodiment of the invention, the writing surface 51 is provided with a number of operation boxes 53, 55, 57, 59 as shown in FIG. 5. The operations indicated are only examples and many other operations are conceivable. One of the operation boxes, 53, is marked with "delete". The user now puts the pen in the delete box 53 to initiate the editing. The process of the pen 31 detects that the pen 31 is placed in an operation box and identifies the actual marking stroke 21 as the stroke that follows the initiation. It is preferred for the user first to indicate that an editing is to be carried out and then to perform the marking, but the reverse order and other variants are within the scope of the invention.

Figure 2B:
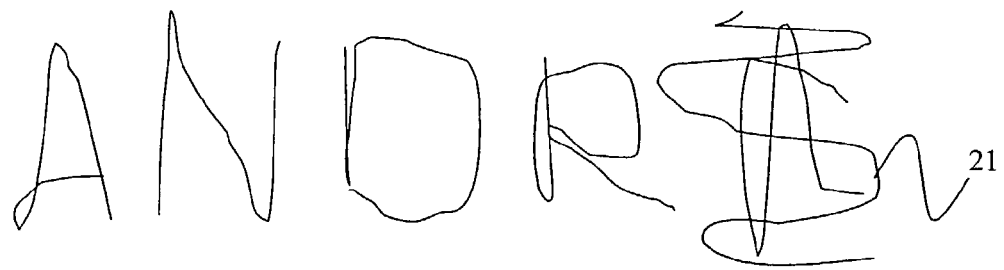

The next measure of the user is to mark the letter that is to be deleted by drawing an undulating stroke 21, see FIG. 2b, across the letter. It is the user's personal way of marking previously written characters. Basically, the inventor is in no way dependent on how this marking is made. It is the invention's strong point that the user does not have to follow stringent rules of how the marking is to be made. In practice, there are however only a few basic conditions that must be known to the user to ensure that an editing should touch precisely the desired part of what has been written, as will be explained in more detail below. However, these conditions are very easy to understand and easy to apply.

Figure 1:
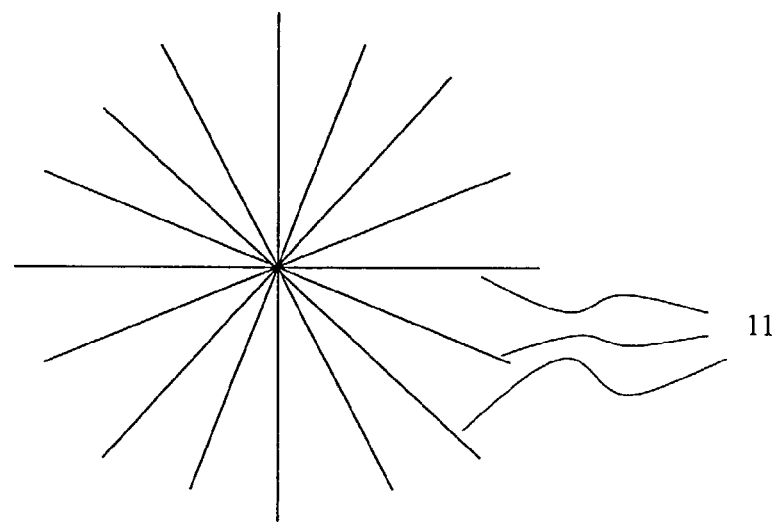
FIG. 1 is a schematic view of a convex envelope in a starting position according to an embodiment of the method according to the invention.

Now begins the determination of a convex envelope that is to surround the marking stroke 21. To facilitate the operation of the processor, the convex envelope, which below is also referred to as the envelope only, is approximated with a number of planes forming a polygon. The number of planes varies significantly with the application, but, as an example, it may be mentioned that 50-60 planes function well in the application involving writing on a position-coded sheet of paper that has been described above. The planes are preferably rotated round a common axis so that the angle between two arbitrary planes, which are located close to each other in terms of angle, is the same for all planes. In other words, the angles for the normals of the planes are uniformly distributed over an entire revolution. Initially the planes are located as shown in FIG. 1, where each plane is represented with a line 11 in the x-y plane, the envelope having essentially no extent since all planes 11 have a common point of intersection. For reasons of clarity, the number of planes in the Figures has been chosen to be small and considerably smaller than is convenient in many actual applications, which means that a relatively inaccurate approximation of the minimal convex envelope is obtained. In practice, however, the number of planes is selected to be sufficiently great for a desirable correspondence with the theoretical minimal envelope to be achieved. In any case, an essentially minimal envelope is thus obtained.

Figure 2C:
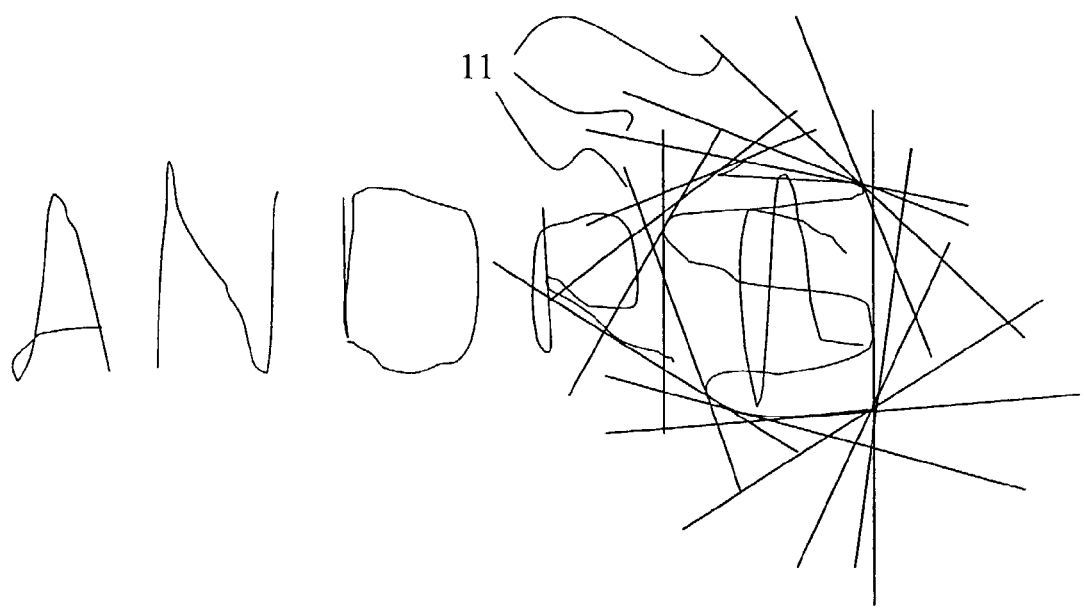
Figure 2D:
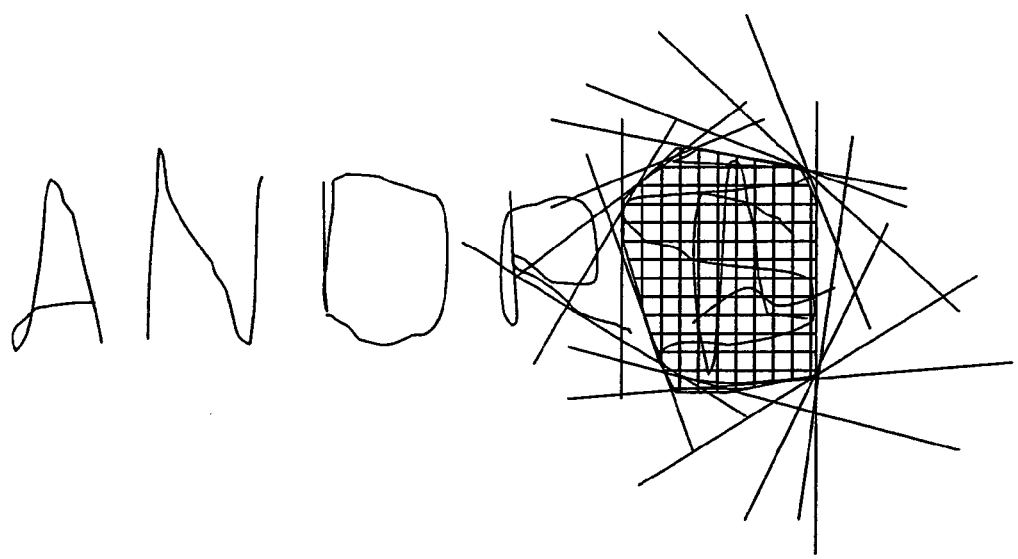
Figure 2E:
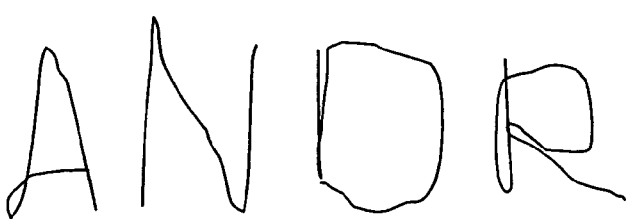
Figure 2F:
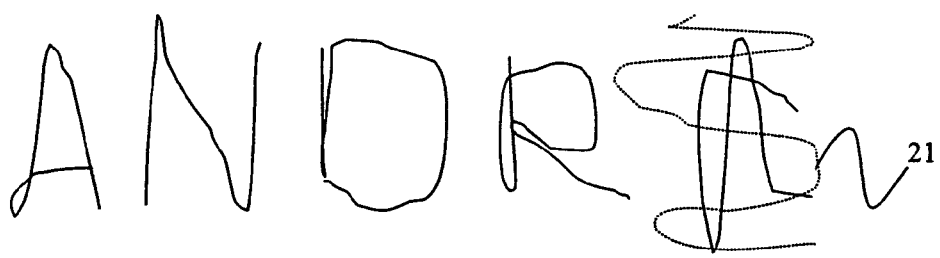

As shown in FIG. 2f, the natural electronic representation of an inputted character is a sequence of positions, as illustrated with dots in the Figure, since some kind of sampling takes place and the sampling frequency is not infinite. For the sake simplicity, the term dot will below be used as an equivalent of position. The method of determining the convex envelope, or, if desirable, the extent of the convex envelope, operates on the marking stroke 21 dot by dot. In accordance with that described above, the location of each dot is compared with the location of each of the planes 11. If the dot is positioned on the outside of the plane, the plane is moved in parallel so that the dot will get into the plane. FIG. 2c shows the result after processing of all dots in the marking stroke 21. In FIG. 2d, the area surrounded by the envelope has been elucidated with a check pattern, that does not exist in actual use of the inventive method.

With reference to the flow chart in FIG. 7 in combination with FIG. 6, an embodiment of the determination of the convex envelope will now be described, applied to a simple case. This determination is advantageously carried out as a procedure in a computer program. As shown in FIG. 6 there are four planes which define the convex envelope, and three positions which are assumed to be samples of a marking stroke. The positions are illustrated for the sake of clarity with well visible dots 61, 62 and 63. In reality, the dots 61-63 have no extent in terms of definition. It is assumed that the dots 61, 62, 63 have been formed in the order as mentioned when the marking stroke was performed. The determination of the convex envelope is initiated, box 701, by the four planes P0, P1, P2, P3 being initiated. The planes P0-P3 are distributed in terms of angle, equidistantly along a revolution round the z axis. In order to clearly show the principle of the method, the planes have been arranged at the angles P0: 45 degrees, P1: 135 degrees, P2: 225 degrees and P3: 315 degrees. The corresponding angles of the normals N0-N3 of the planes are N0: 315 degrees, N1: 45 degrees, N2: 135 degrees and N3: 225 degrees. The normals are interesting since it is on their values that the calculations are carried out. To increase the understanding, the mutually parallel planes P0 and P2 and respectively P1 and P3 are slightly relatively offset in the normal direction. It goes without saying that in reality the planes P0 and P2 and respectively the planes P1 and P3 coincide.

Figure 6A:
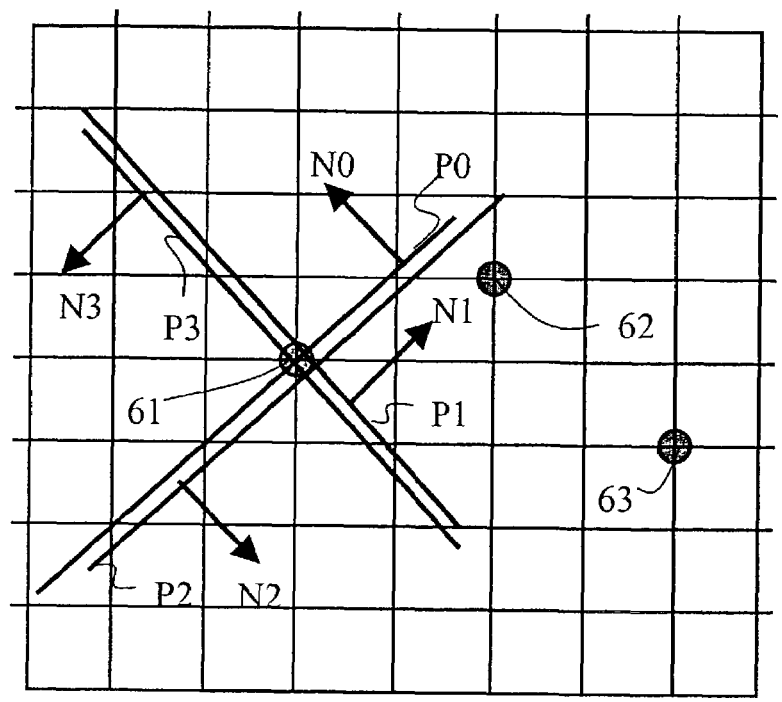
FIGS. 6a-c illustrate a simple basic example of the application of the method step by step.
Figure 7:
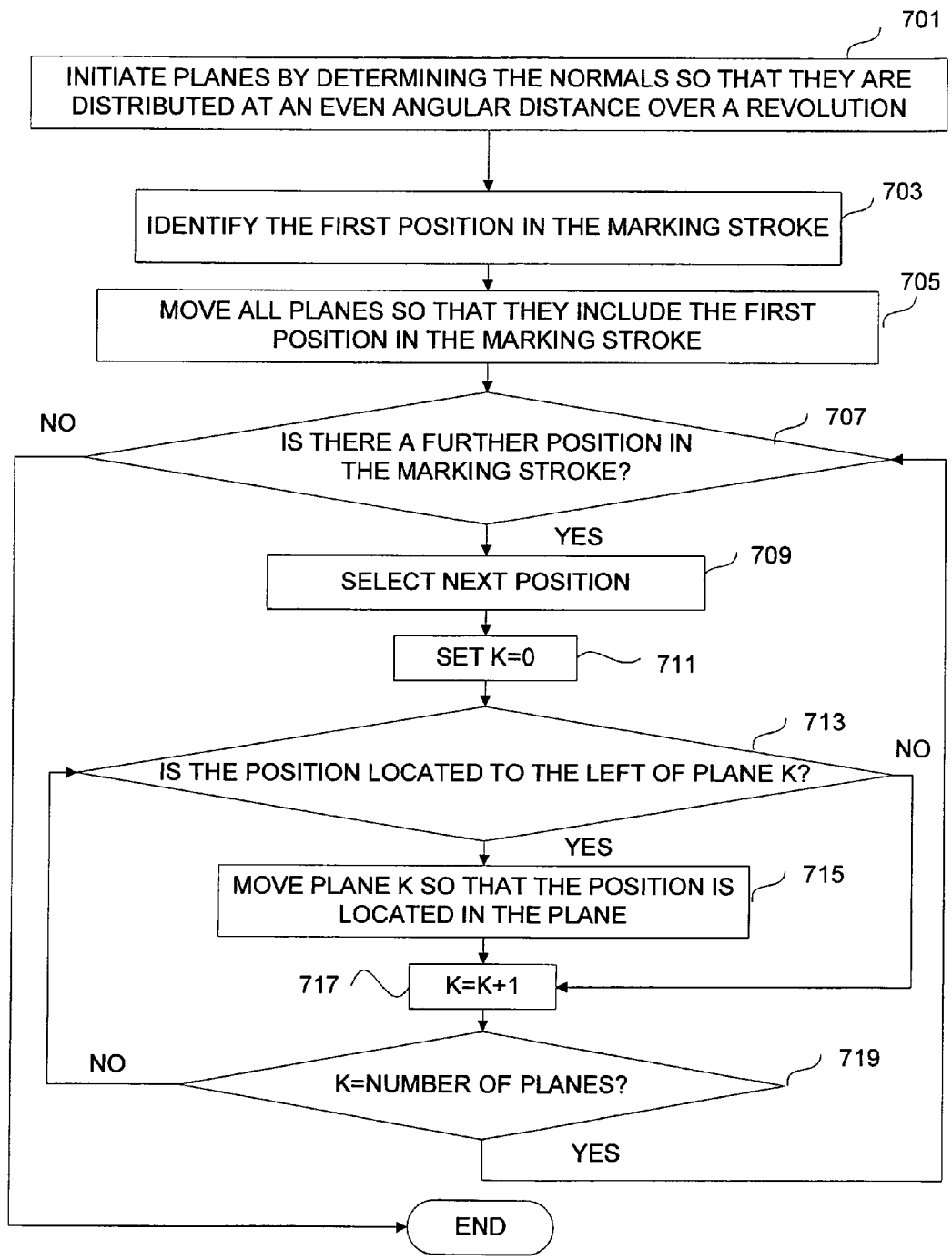
FIG. 7 is a flow chart of an embodiment of the inventive method.

Then the first position in the marking stroke, i.e. dot 61, is identified, box 703, and all planes P0-P3 are moved, box 705, so that they include the first dot 61, see FIG. 6a. More precisely, this movement will be carried out as follows.

According to the plane equation $Ax+By+Cz+D=0$ $C=0$ for all planes P0-P3. When the planes P0-P3 are initiated, the first position in the marking stroke is selected as the common dot, and D is determined. Let us assume, for the sake of simplicity, that the selected dot 61 is in the origin of coordinates in the x-y plane. This means that $D=0$. The normals N0-N3 are defined as unit normals, and therefore we obtain the following combinations of A and B as well as the following plane equations P0: $A=-1$, $B=1 \Rightarrow -x+y=0$;

P1: $A=1$, $B=1 \Rightarrow x+y=0$;

P2: $A=1$, $B=-1 \Rightarrow x-y=0$; and

P3: $A=-1$, $B=-1 \Rightarrow -x-y=0$

Figure 6B:
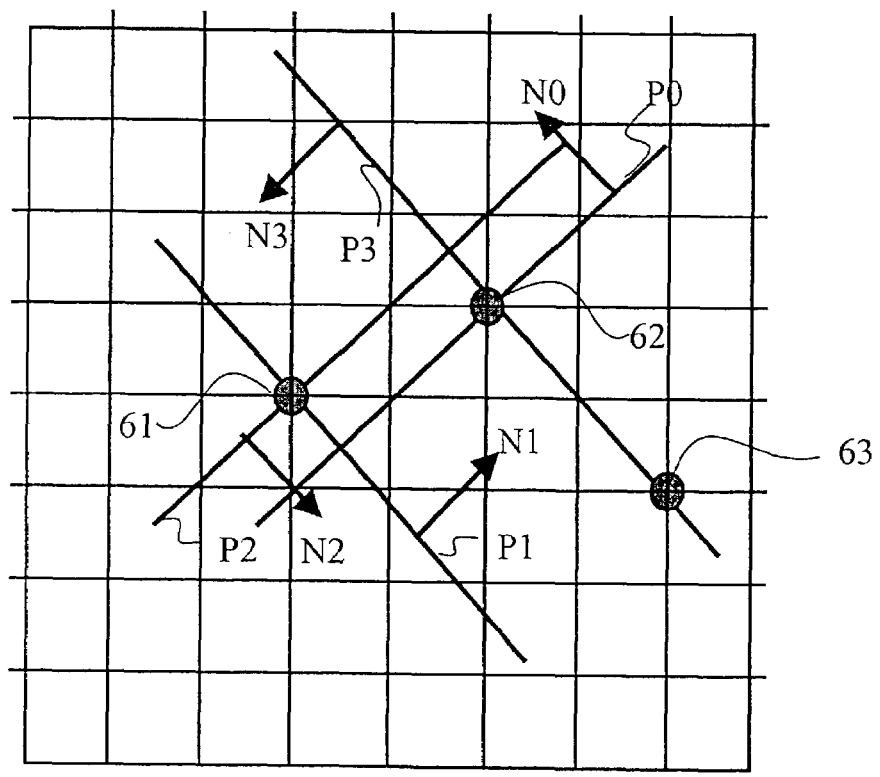
Figure 6C:
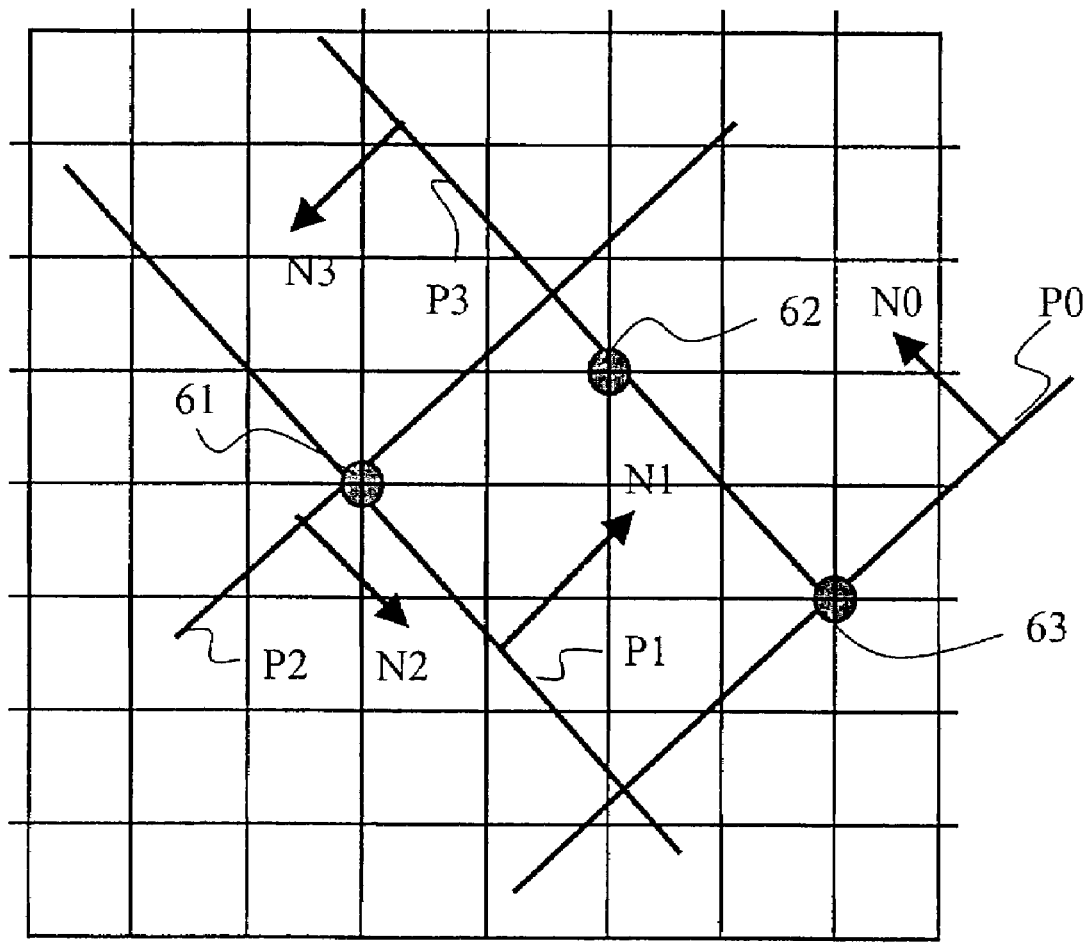

In FIGS. 6a-6c, a check pattern has been inserted in order to easily define and show the positions of the dots 61-63. The coordinates (x, y) for the dots 61-63 are as follows: 61=(0,0); 62=(2,1); and 63=(4,-1).

The next step in the determination of the convex envelope means that the next position, if available, is selected for processing, box 707 and box 709. In this case there is a next position in the form of the dot 62. A calculator, K, is set to zero, box 711. The location of the dot 62 is the next to be related to each plane. As location criterion, box 713, use is made of the definition that a dot is located to the left of a plane and, thus, outside the convex envelope which is made up by the planes P0-P3 if the coordinates of the dot, which are inserted into the equation of the plane, give a negative result. The plane is then moved so that the result will no longer be negative, box 715. In this simple example, the plane is moved so that the result will be zero.

For dot 62, the following takes place. The plane equation for the first plane P0 will be $-x+y=-2+1=-1$. Thus the plane need to be moved. This means that a new D is determined as follows: $-x+y+D=0 \Rightarrow D=x-y=2-1=1$. The new equation for P0 will thus be $-x+y+1=0$. The new location of the plane P0 is evident from FIG. 6b. The calculator is incremented, box 717, and a check is made to find out whether the new value, K=1, is equal to the number of planes, i.e. 4. If so, a jump is made back to step 707 and a check is made to find out whether there is a further position to process.

If, however, K<4, calculations are carried out for the second plane P1 corresponding to those for the first plane P0. The calculations give: $x+y=2+1=3$ which means that the location of the plane P1 is unchanged. For the third plane P2, the following is obtained: $x-y=2-1=1$, which causes an unchanged location. Finally, for the fourth plane P3 the following is obtained: $-x-y=-2-1=-3 \Rightarrow$ new D=3, i.e. a new plane equation $-x-y+3=0$.

After the processing of the second dot 62, the extent of the envelope has increased and is defined by a rectangle whose corners consist of the intersecting points between P0 and P3; P0 and P1; P1 and P2 and respectively P2 and P3. The two dots 61 and 62 are placed in diagonally opposite corners of the rectangle, more specifically in the intersecting points between P1 and P2 and respectively between P0 and P3.

Next, from step 707, the third dot 63 is processed, whose coordinates are (4, −1). For the first plane P0 the following is obtained: $-x+y+1=-4-1+1=-4$. Once more this plane needs to be moved. The new equation will be: $-x+y+5=0$. The locations of the remaining planes are unchanged. However, it is to be particularly noticed that the equation for the fourth plane P3 will be $-x-y+3=-4+1+3=0$, i.e. the third dot 63 is located in the fourth plane after the above-described displacement. The resulting convex envelope is a further extended rectangle where a new corner point instead of the second dot 62 is the third dot 63, as shown in FIG. 6c.

Now consider once more the more complex example in FIGS. 2c/2d. When the convex envelope has been determined, the next step will be to identify the remaining data, in addition to the data of the actual marking stroke 21, so that it can be established to which data the editing is to relate. Since the edge of the envelope, i.e. the polygon, is now defined, said remaining data can be determined by the processor comparing the positions on the writing surface for the stored strokes with the positions for the sides of the polygon. The comparison preferably proceeds in a way similar to the way in which the dots of the marking stroke 21 were compared with the locations of the planes 11, as was also described in more detail above in connection with FIGS. 6a-c. The previously read and stored strokes that have been performed on the writing surface, more specifically, preferably the surface on which the first position in the marking stroke is located, are thus processed position by position and compared with the locations of the planes. The data set that must be processed is thus advantageously restricted to the page on which the marking is made. Further restrictions of the data set may be involved. For such a restriction, methods that are per se known are available. As an example, so-called divide and conquer algorithms can be mentioned. In contrast to the case of determining the envelope, the planes are, of course, not moved. If a position is located inside all planes, the dot is located within the envelope, i.e. in the check patterned area in FIG. 2d. When all dots in the strokes selected for processing have been processed, data representing at least a part of a character, and in this case a whole character, that is located within the envelope, has been identified. The operation indicated, in this case deleting, is then carried out on this identified data, after which the stored data in this case represents the remaining characters shown in FIG. 2e. Of course, the appearance of the writing surface still is the same as in FIG. 2b. The user can now choose either to let the text remain or to write something new across the marking.

Figure 4:
FIG. 4 illustrates an alternative way of marking text that is to be edited.

There are at least two different alternatives to determine which data is actually intended by the user by means of the marking. One aspect is that exactly what is located within the envelope is that on which the operation is to be carried out. Another way of looking at the matter is that the user relates to the whole stroke only. Even if only a portion of a stroke, in the extreme case a single position, is located within the envelope and the rest outside, it is assumed that the user intends to do something with the whole stroke. The last-mentioned way of looking at the matter is illustrated in FIG. 4. The user has only made a stroke 41 across the letter that is to be deleted. The extent of the envelope will in this case be most restricted and extends insignificantly outside the actual stroke 41. The major part of the letter will therefore be positioned outside the envelope. With the interpretation that the whole stroke is intended to be processed, the final result will be the same as above, i.e. the remainder of the text will be the one as shown in FIG. 2e. As long as the user is informed of the conditions of how a marking is to be interpreted, it is easy for the user to perform a marking so as to be sure about what will actually be edited.

Many different operations are feasible, for instance those disclosed in Applicant's International Patent Application PCT/SE01/00585. FIG. 5 illustrates examples of some operations. The striped elongate operation box 59 illustrates a color scale which can be preprinted on the surface 51. The operation of selecting color could be implemented either by putting the pen 31 in box 59, or in two steps, first putting the pen in the box "color" 55 to indicate the type of operation and then putting the pen in box 59 to select the shade of color. This operation of selecting color is intended for selecting display color for marked characters when they are shown on the screen of said second device 39. Additional examples are other formattings of the marked characters, and the operation of sending data, i.e. sending precisely the data selected by the marking.

ALTERNATIVE EMBODIMENTS

The above description involves merely non-limiting examples of how the invention can be implemented. Many modifications are feasible within the scope of the invention as defined in the appended claims.

One example of an alternative embodiment is an application to a different type of equipment for handwriting, viz. a hand-held computer or like electronic device where the user writes directly on a screen, for instance an LCD screen or a pressure-sensitive screen, and what is written is stored merely electronically. In this case there is a possibility of feedback which makes it possible for the user to directly see the result of an editing. Further examples of other types of writing equipment are digital white boards, digital flipcharts and digital notebooks. There are also other options as regards position determination of the writing device. The method according to the invention is, however, carried out in the same way as when using pen and paper.

Merely two-dimensional applications have been described in more detail above. The invention also concerns three-dimensional applications. The method is carried out in an essentially equivalent manner. An example of application is in a device for virtual reality where a hand-held unit can be used to create three-dimensional products as well as edit the same by moving one's hand in the air.

There are differences as regards details. For instance, when the approximation with planes is used as description of the convex envelope, the plane equation contains a variable z normal. In other words, also C is different from zero in the plane equation $Ax+By+Cz+D=0$.

What we claim and desire to secure by Letters Patent is:

1. A computer-implemented method of editing data generated by handwriting, comprising: detecting an initiation of an editing; identifying a marking stroke which marks data that is to be edited; determining an essentially minimal convex envelope which surrounds the marking stroke; identifying the remaining data, in addition to the data of the actual marking stroke, which is positioned within the convex envelope; and performing an editing operation on said data positioned within the convex envelope.

2. A method as claimed in claim 1, wherein the step of detecting an initiation of an editing is carried out before the step of identifying a marking stroke, and wherein the marking stroke is the stroke that is performed in connection with the initiation.

3. A method as claimed in claim 1, wherein the step of detecting an initiation of an editing is carried out after the step of identifying a marking stroke, and wherein the marking stroke is the last stroke that is performed before the initiation.

4. A method as claimed in any one of claims 1-3, wherein the step of determining a convex envelope comprises the step of changing the extent of the convex envelope from a starting position so that it exactly surrounds the marking stroke.

5. A method as claimed in claim 4, wherein the step of changing the extent of the convex envelope is carried out in such manner that the convex envelope in the starting position has a smallest extent which is then widened to a necessarily large area.

6. A method as claimed in claim 4, wherein the convex envelope is approximated with a convex envelope consisting of a plurality of intersecting planes.

7. A method as claimed in claim 6, wherein the planes are arranged in such manner that they are mutually rotated round a common axis in space and their angles of rotation are uniformly distributed over a revolution.

8. A method as claimed in claim 6, wherein the marking stroke is defined as comprising one or more positions, and wherein the step of changing the extent of the convex envelope for each position comprises the steps of relating the location of the position to each plane, one plane at a time; and moving the plane if the position according to a location criterion is located on the outside of the plane and thus outside the convex envelope, so that the position is located in or on the inside of the plane and thus within the convex envelope.

9. A method as claimed in claim 8, wherein the location criterion is determined based on the plane equation $Ax+By+D=0$, a position being defined to be located to the right of a plane when its x and y coordinates introduced in $Ax+By+D$ give a positive sum and to the left of the plane in case of a negative sum, and wherein one side of the plane is determined to constitute the inside.

10. A method as claimed in claim 1, wherein the step of identifying the remaining data, in addition to the data of the actual marking stroke, which is positioned within the convex envelope comprises the step of searching for said remaining data among data for one or more previously performed strokes, and wherein the step of carrying out an editing operation comprises the step of editing said remaining data.

11. A method as claimed in claim 1, wherein the step of identifying the remaining data, in addition to the data of the actual marking stroke, which is positioned inside the convex envelope comprises the step of searching for said remaining data among data for one or more previously performed strokes, and wherein the step of carrying out an operation comprises the step of editing data for the whole stroke/strokes of which said remaining data constitutes at least a part.

12. A method as claimed in claim 11, wherein the step of editing data for said whole stroke is conditioned by a predetermined performing of the marking stroke.

13. A method as claimed in claim 1, wherein the step of carrying out an editing operation comprises at least one of the measures in a group of measures which comprise editing, copying and formatting.

14. A method as claimed in claim 13, wherein the group further comprises the measure of sending data.

15. A method as claimed in claim 1, wherein the convex envelope surrounding the marking stroke is polygonal.

16. A method as claimed in claim 1, wherein the step of detecting an initiation of an editing comprises the step of detecting the location of a handwriting device within an initiation area on a surface.

17. A method as claimed in claim 1, wherein the data generated by handwriting represents characters that are handwritten on a surface which is provided with a position code coding a plurality of positions on the surface, the position code being detectable by means of a device for such detection.

18. A method as claimed in claim 17, wherein said device comprises a handwriting unit, the surface comprising an initiating portion and the step of detecting an initiation comprising the step of detecting an application of the handwriting unit of the device within the initiating portion.

19. The method of claim 17, wherein the surface has a position code imprinted thereon, which comprises groups of dots, each group coding a unique position, wherein the position is coded by dots in each group of dots being displaced in relation to a reference raster.

20. A computer-implemented method of editing data representing characters which have been recorded when writing using a handwriting device on a surface which is provided with a position code coding a plurality of positions on the surface, the handwriting device comprising a detector for detection of the position code, the method comprising: detecting an initiation of an editing; identifying a marking stroke which comprises at least one coded position and which marks data that is to be edited; determining a convex envelope which surrounds the marking stroke; identifying the remaining data, in addition to the data of the actual marking stroke, which is positioned within the convex envelope, said remaining data comprising at least one coded position; carrying out an editing operation on said data positioned within the convex envelope.

21. A method as claim 20, wherein the step of determining a convex envelope comprises the steps of defining a starting envelope of a minimum extent; and for each coded position included by the marking stroke, determining whether the position is located within the convex envelope or not and, if the position is located outside the envelope, extending the envelope so that it includes the position.

22. A method as claim 21, wherein the convex envelope is approximated with a convex envelope which consists of a plurality of intersecting planes.

23. A method as claim 22, wherein the step of determining a convex envelope for each position in the marking stroke comprises the steps of relating the location of the position to each plane, one plane at a time; and moving the plane if the position according to a location criterion is located on the outside of the plane and thus outside the convex envelope so that the position is located in or on the inside of the plane and thus within the convex envelope.

24. A handheld device comprising:
a writing implement for generating a visible trace on a writing surface; and
a reading unit for reading a position code on the writing surface and providing position-defining data; and
a transmitter for transmitting position-defining data,
wherein the position-defining data is provided for
detecting an initiation of an editing;
identifying a marking stroke which marks data that is to be edited;
determining an essentially minimal convex envelope which surrounds the marking stroke;
identifying the remaining data, in addition to the data of the actual marking stroke, which is positioned within the convex envelope; wherein an editing operation is performed on said data positioned within the convex envelope.

25. The handheld device of claim 24, wherein the handheld device performs the editing operation.

26. A computer program for editing data generated by handwriting, said computer program being stored on a computer-readable memory medium and comprising instructions for causing the computer to detect an initiation of an editing; identify a marking stroke which marks data that is to be edited; determine an essentially minimal convex envelope which surrounds the marking stroke; identify the remaining data, in addition to the data of the actual marking stroke, which is positioned within the convex envelope; and carry out an editing operation on said data positioned within the convex envelope.

* * * * *